United States Patent
Maeda et al.

[11] Patent Number: 5,812,224
[45] Date of Patent: Sep. 22, 1998

[54] HEAD-MOUNT IMAGE DISPLAY APPARATUS

[75] Inventors: Yoshihiro Maeda; Motohiro Atsumi; Hiroyoshi Kobayashi; Kazuya Yamanaka, all of Hachioji, Japan

[73] Assignee: Olympus Optical Co., Ltd., Tokyo, Japan

[21] Appl. No.: 731,726

[22] Filed: Oct. 18, 1996

[30] Foreign Application Priority Data

Oct. 31, 1995 [JP] Japan .................................. 7-283501

[51] Int. Cl.⁶ .................................................. G02F 1/1335
[52] U.S. Cl. .................................. 349/13; 349/11; 345/8
[58] Field of Search ................................ 349/13, 15, 11; 345/8; 359/15

[56] References Cited

U.S. PATENT DOCUMENTS

| | | | |
|---|---|---|---|
| 5,081,542 | 1/1992 | Efron et al. | 349/11 |
| 5,413,483 | 5/1995 | Witt, III | 349/13 |
| 5,440,197 | 8/1995 | Gleckman | 349/13 |
| 5,671,037 | 9/1997 | Ogasawara et al. | 351/158 |
| 5,683,297 | 11/1997 | Raviv et al. | 349/8 |
| 5,696,521 | 12/1997 | Robinson et al. | 345/8 |
| 5,708,449 | 1/1998 | Heacock et al. | 345/8 |

FOREIGN PATENT DOCUMENTS

| | | |
|---|---|---|
| 0 551 781 A1 | 7/1993 | European Pat. Off. ............ 349/13 |
| 06315124 A | 11/1994 | Japan . |
| 07092441 A | 4/1995 | Japan . |

*Primary Examiner*—William L. Sikes
*Assistant Examiner*—Toan Ton
*Attorney, Agent, or Firm*—Frishauf, Holtz, Goodman, Langer & Chick

[57] ABSTRACT

It is the object of the invention to provide a compact and highly stable head-mount image display apparatus capable of always transmitting voice information of an optimal volume, irrespective of the positional relationship between the head and the ear of an observer, which is related to the shape and/or size of the head. To attain the object, speakers incorporated in the apparatus of the invention can be moved to desired positions in accordance with changes in the positional relationship between the head and the ears of observers. Further, the apparatus of the invention can be folded to reduce the area the apparatus occupies.

8 Claims, 8 Drawing Sheets

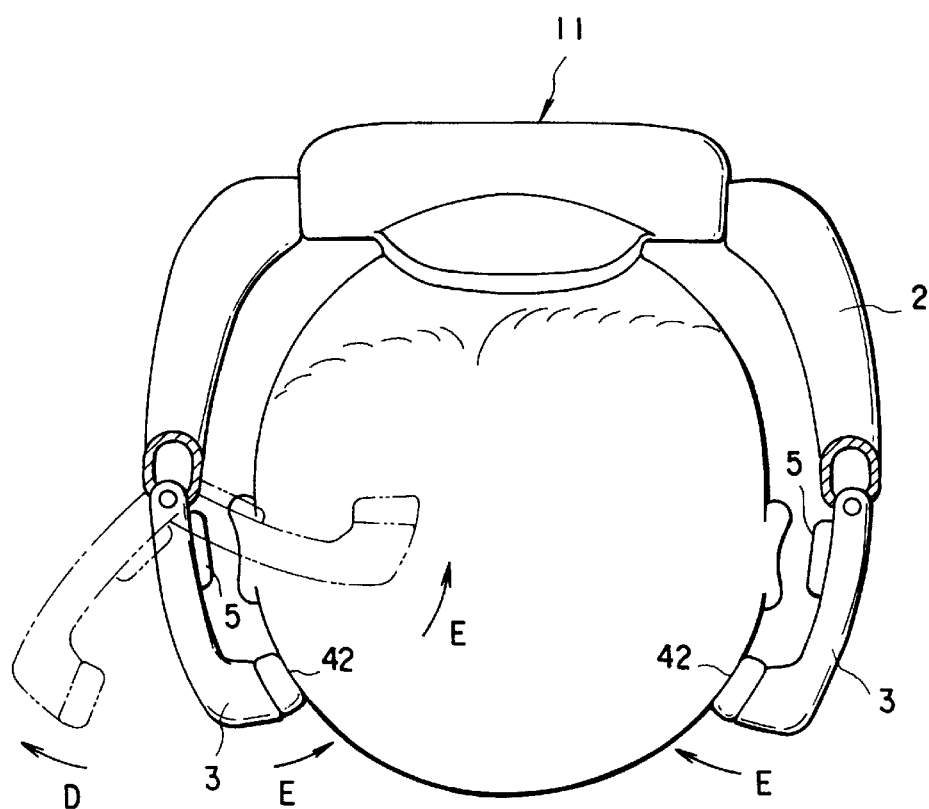
FIG. 7
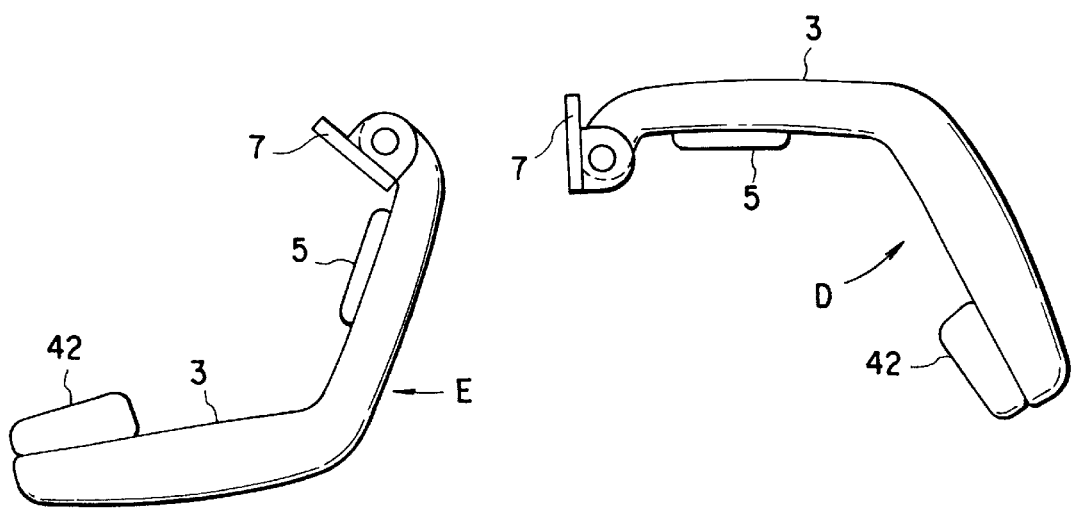
FIG. 8A
FIG. 8B

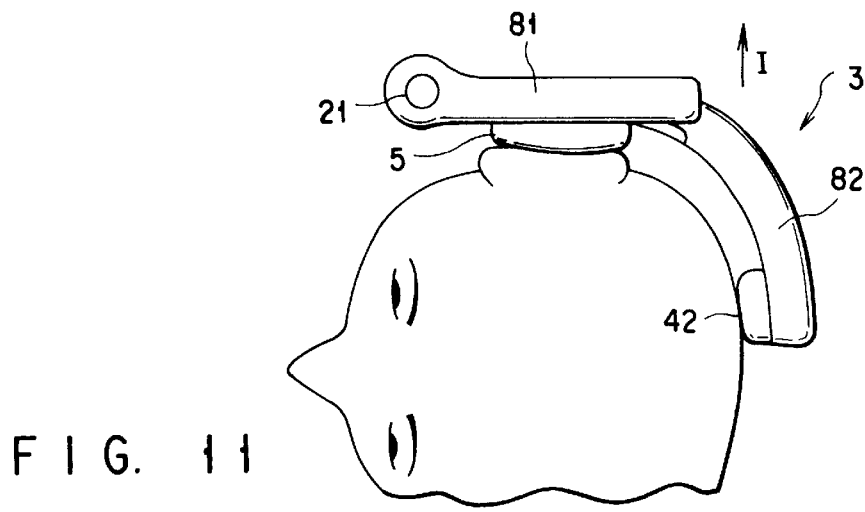
F I G. 11
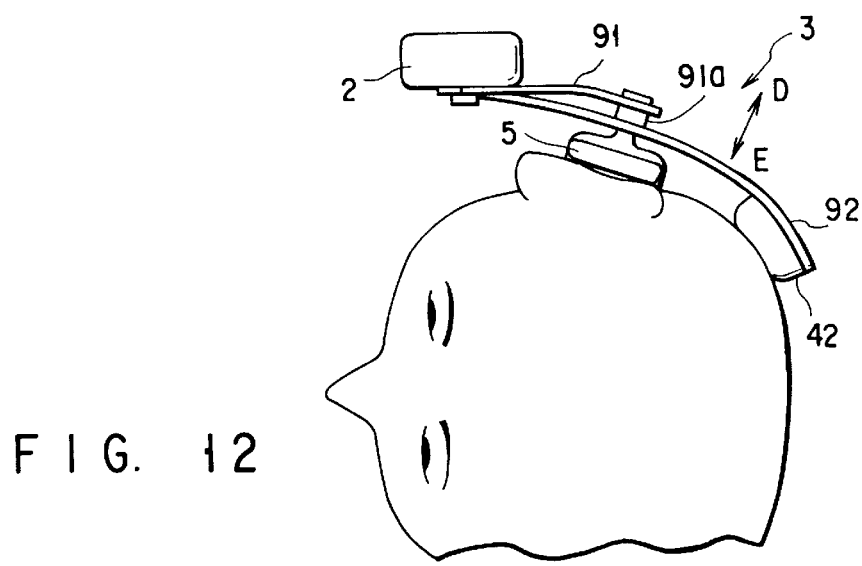
F I G. 12
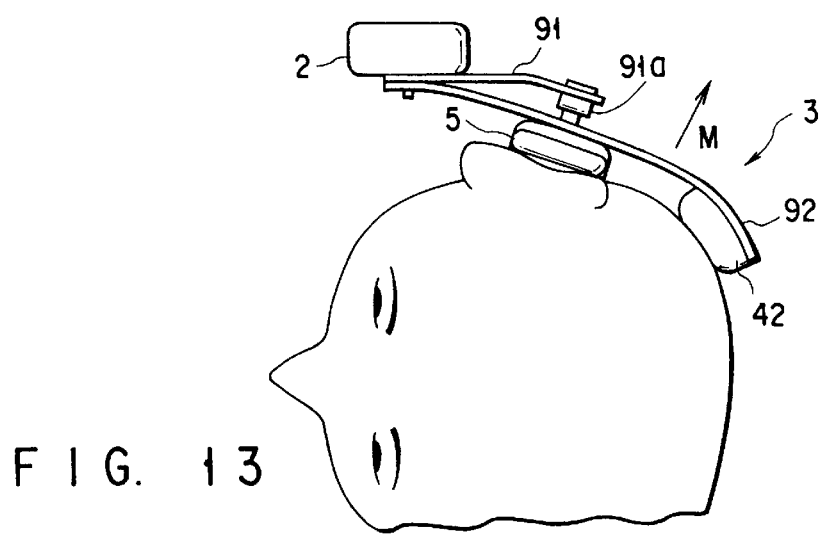
F I G. 13

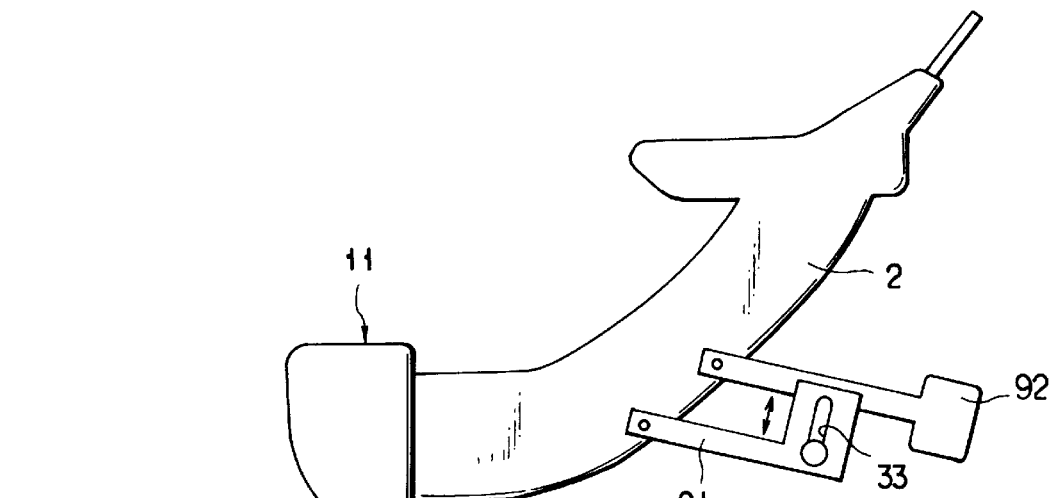
F I G. 14
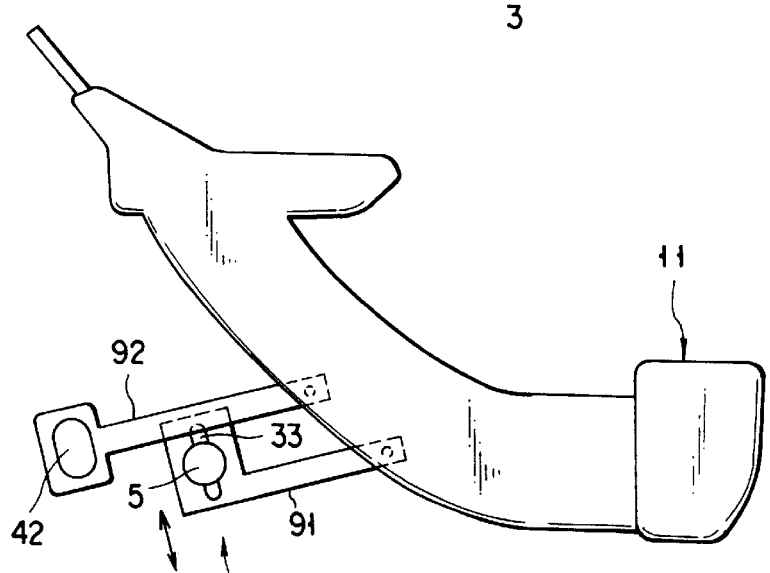
F I G. 15
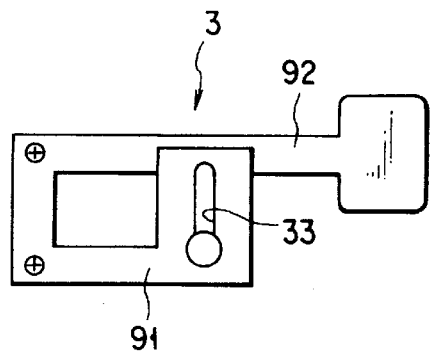
F I G. 16

HEAD-MOUNT IMAGE DISPLAY APPARATUS

BACKGROUND OF THE INVENTION

1. Field of the Invention

This invention relates to a head-mount image display apparatus equipped with image display apparatus body attachable to the head of an observer and containing therein respective optical systems for guiding predetermined images to the eye balls of the observer.

2. Description of the Related Art

Japanese Patent Application KOKAI Publications Nos. 7-92441 and 6-315124, etc. disclose head-mount image display apparatuses.

Referring to FIG. 17, the apparatus disclosed in Japanese Patent Application KOKAI Publication No. 7-92441 has a pair of image display apparatus bodies 1' for guiding predetermined images to the left and right eye balls of an observer, a support member 2' attachable to the head of the observer, and speakers 5' fixed to the support member 2'. The image display apparatus bodies 1' are disposed to be movable along the support member 2'.

In this structure, the positioning of the image display apparatus bodies 1' with respect to the left and right eye balls is performed by moving the bodies 1' in directions indicated by the arrows after mounting them on the head.

Referring then to FIG. 18, the apparatus disclosed in Japanese Patent Application KOKAI Publication No. 6-315124 has a pair of image display apparatus body 1" for guiding predetermined images to the left and right eye balls of an observer, a support member 2" attachable to the head of the observer, and speakers 5" coupled monolithically with the support member 2". The image display apparatus body 1" is disposed to be movable in the vertical direction as indicated by the arrow.

In this structure, the positioning of the image display apparatus body 1" with respect to the left and right eye balls is performed by moving the body 1" in directions indicated by the arrows after mounting them on the head.

Actually, different observers have heads of different shapes and sizes, and accordingly different positional relationships between their heads and ears.

In the conventional apparatuses, however, the speakers are fixed to the support member, and hence there may well be a case where the speakers are deviated from the ears of the observer. In this case, it is hard to transmit voice information with presence to the observer.

Moreover, since the conventional apparatuses have such shapes as cannot be kept well-balanced on a table, etc., they may easily fall from the table and damaged.

Also, where the irregularly shaped apparatus is repeatedly placed on the table, the apparatus has its different portions brought into contact with the table. Accordingly, it is hard to expect which portion of the apparatus will be easily damaged. This is the reason why substitutional component parts corresponding to all component parts of the apparatus must be always prepared, which means that the apparatus requires lots of maintenance labor.

In addition, since the conventional apparatus requires a large occupation area, its storage place is limited, and it cannot easily be stored or packed.

SUMMARY OF THE INVENTION

It is the object of the invention to provide a compact and highly stable head-mount image display apparatus capable of always transmitting voice information of an optimal volume, irrespective of the positional relationship between the head and the ear of the observer, which is related to the shape and/or size of the head.

To attain the object, speakers incorporated in the apparatus of the invention can be moved to desired positions in accordance with changes in the positional relationship between the head and the ears of observers. Further, the apparatus of the invention can be folded to reduce the area the apparatus occupies.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view, showing a state of the head-mount image display apparatus of the invention mounted on the head of an observer;

FIG. 8A is a view, showing a state of each rotating member put in contact with a fixing member;

FIG. 8B is a view, showing a state of each rotating member put in contact with a fixing member;

FIG. 11 is a view, showing a state in which only the first rotating member is moved in accordance with the size of the ear of an observer;

FIG. 12 is a view, showing an essential part of a head-mount image display apparatus according to a modification of the invention;

FIG. 13 is a view, showing a state in which only a first elastic member is moved in accordance with the size of the ear of the observer;

FIG. 14 is a view, showing examples of first and second elastic members;

FIG. 15 is a view, showing examples of the opposite sides of the first and second elastic members of FIG. 14;

FIG. 16 is a view, showing a modification of the rotating member shown in FIGS. 14 and 15;

DETAILED DESCRIPTION OF THE PREFERRED EMBODIMENTS

A head-mount image display apparatus according to an embodiment of the invention will be described with reference to the accompanying drawings.

Figure 1:
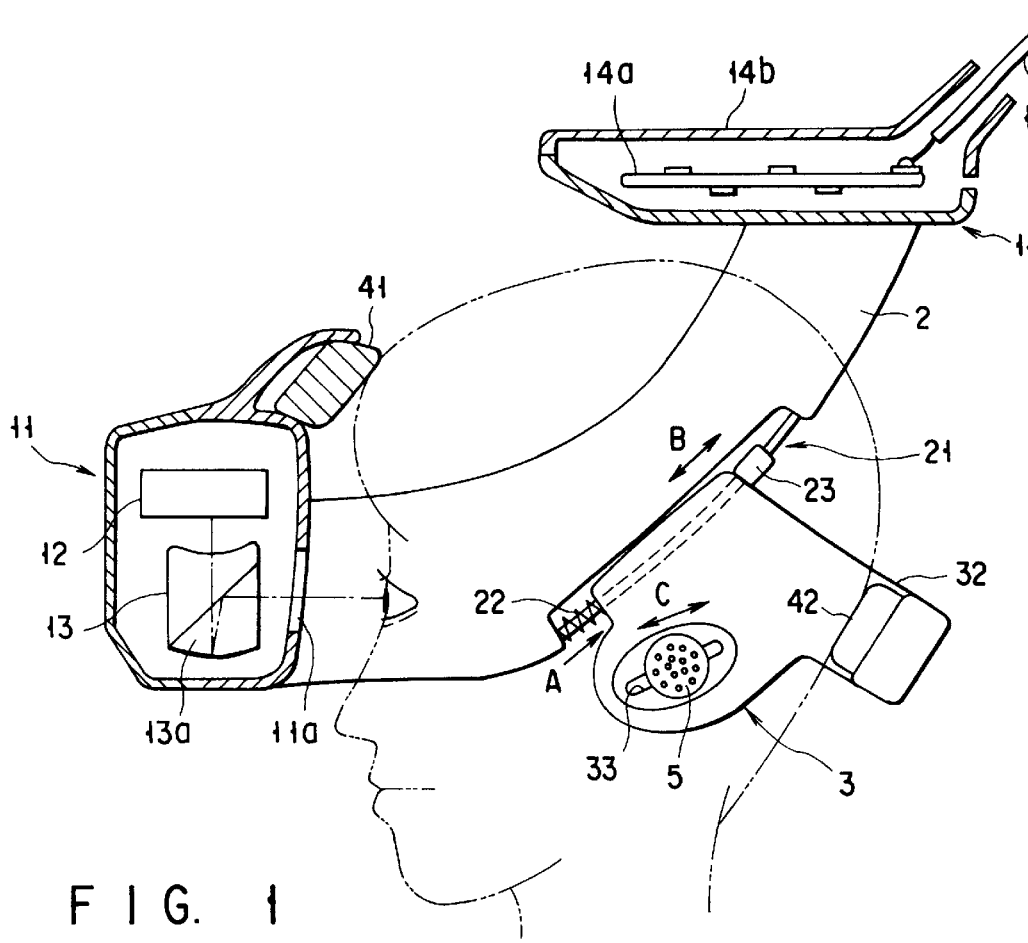
FIG. 1 is a view, showing a head-mount image display apparatus according to an embodiment of the invention.
Figure 2:
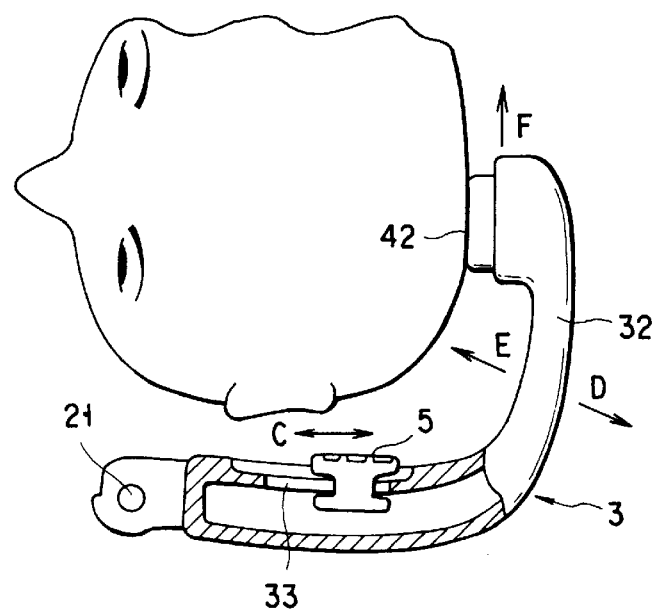
FIG. 2 is a view, showing rotating members incorporated in the apparatus of FIG. 1 for supporting speakers.

As is shown in FIGS. 1 and 2, the head-mount image display apparatus according to the embodiment comprises a display apparatus body 11 for displaying a predetermined image thereon, a pair of support members 2 supporting the display apparatus body 11, a pair of speakers 5 for outputting predetermined voice information, and a control unit 14 for controlling output voice/image information. Only one of the support members 2 and only one of the speakers 5 are shown in FIGS. 1 and 2.

The display apparatus body 11 contains a backlight (not shown), image display elements 12 and eyepiece optical systems 13. Each image display element 12 can be constituted, for example, by a liquid crystal display or a CRT display, and each eyepiece optical system 13 by a prism optical system 13a.

The display apparatus body 11 has a pair of apertures 11a of a predetermined size formed in surface portions thereof opposed to the right and left eye balls of the observer. The apparatus body 11 further includes a frontal pad 41 to be brought into contact with the forehead of the observer so as to align the apparatus body 11 (the apertures 11a) with the eyes of the observer.

The pair of support members 2 are attached to the opposite side ends of the display apparatus body 11, respectively, so that they will be arranged along side portions of the head of the observer, respectively, when the image display apparatus is mounted on the head The control unit 14 has a cover 14b attached to the other ends of the support members 2, and a drive circuit 14a contained in the cover 14b for controlling the image display element 2 and the speakers 5.

The drive circuit 14a is connected to a cable 15 extending from a signal generating unit (not shown), which is controlled to generate predetermined voice and image signals.

In the above-described structure, image and voice signals generated from the signal generating unit are input to the drive circuit 14a through the cable 15. The drive circuit 14a, in turn, controls the image display elements 12 and the speakers 5 on the basis of the input image and voice signals. As a result, predetermined image/voice information items are output by the image display elements 12 and the speakers 5, respectively.

The image displayed on each image display element 12 is enlarged by the prism optical system 13a and then output from the display apparatus body 11 through the apertures 11a. As is shown in FIG. 1, where the image display apparatus is mounted on the head of the observer, the image output through the apertures 11a is guided to the right and left eye balls of the observer.

Rotating members 3 with a substantially L-shaped section are attached to the support members 2, respectively, and support the speakers 5, respectively. The rotating members 3 have the same structure and shape and are opposed to each other. Similarly, the speakers 5 have the same structure and shape and are opposed to each other. Therefore, only one of the support members and only one of the speakers will be described below.

The rotating member 3 is movably supported by a shaft 21 attached to a lower edge portion of the support member 2 and extending in the same direction as the member 2. More specifically, the rotating member 3 is slidable along the shaft 21 in directions indicated by arrow B (see FIG. 1), and also rotatable about the shaft 21 in directions indicated by arrows E and D (see FIG. 2).

A compression spring 22 is attached to the shaft 21 and urges the rotating member 3 in a direction indicated by arrow A (see FIG. 1), and a knob 23 is attached to the shaft 21 and positions the rotating member 3.

In this embodiment, a screw portion (not shown) is provided on the outer peripheral surface of the shaft 21, and the knob 23 is engaged with the screw portion. The knob 23 is rotated and moved along the shaft 21, so that the urging force of the compression spring 22 is applied to the rotating member 3. Where the knob 23 is stopped in a predetermined position, the rotating member 3 is urged against the knob 23 by means of the urging force of the compression spring 22. As a result, the rotating member 3 is held between the compression spring 22 and the knob 23 with a certain urging force. This means that the rotating member 3 can be situated in a desired position by adjusting the amount of movement of the knob 23.

Further, an occipital pad 42 to be brought into contact with a rear portion of the head of the observer is attached to a distal end portion 32 of the rotating member 3. It is preferable to provide on the support member 2 urging means such as a torsion spring (see FIG. 3) for urging the rotating member 3, to enable the occipital pad 42 to be brought into contact with the rear head of the observer by an optimal urging force.

Further, it is preferable to form the distal end portion 32 of an elastic member such as a plate spring or an elastic resin member. In this case, the distal end portion 32 elastically deforms in the direction indicated by arrow D (see FIG. 2) in accordance with the shape and/or size of the head of the observer when the image display apparatus is mounted thereon. As a result, the occipital pad 42 can contact the rear head of the observer with an optimal urging force. Moreover, by virtue of the elastic distal end portion 32, the occipital pad 42 brought into contact with the rear head portion slides in a direction indicated by arrow F (FIG. 2) to thereby adjust the contact position. Alternatively, the overall rotating member 3 may be formed of the elastic member.

A groove 33 is formed in the inner side surface of the rotating member 3 such that it extends in a direction indicated by arrow C, and receives therein the speaker 5 such that it can slide therein. Sliding the speaker 5 along the groove 33 enables it to be situated in a desired position.

In the above-described structure, first, each of the rotating members 3 is rotated about the axis 21 in the direction indicated by arrow D before the time of mounting the image display apparatus on the head of the observer. Then, the contact position of the frontal pad 41 with respect to the forehead of the observer is adjusted so as to align the display apparatus body 11 (the pair of apertures 11a) with the eyes of the observer. After the position adjustment, each rotating member 3 is rotated in the direction indicated by arrow E by the force of the hand or by the urging force of the torsion spring. As a result, the occipital pad 42 contacts the rear head of the observer with the optimal urging force, and simultaneously slides in the direction indicated by arrow F thereby to adjust the contact position. Thus, the image display apparatus is reliably mounted on the head of the observer with a force acting between the frontal pad 41 and the occipital pad 42.

In this state, the pair of speakers 5 are not aligned with the ears of the observer, the positions of the knobs 23 are adjusted to situate the rotating members 3 and the speakers 5 in respective desired positions in the vicinity of the ears. Furthermore, the speakers 5 are slid along the grooves 33 to be accurately aligned with the ears. Alternatively, the positions of the speakers 5 may be automatically controlled using a control signal from the control unit 14.

Since as described above, the positions of the speakers 5 can be adjusted voluntarily in accordance with the size and shape of the head of the observer and also with the positions of the ears, the speakers 5 can be accurately aligned with the ears, whereby vivid voice information can be transmitted to the observer. Moreover, the size of the speakers 5 can be reduced as compared with the conventional case, and accordingly the overall apparatus can be made more compact.

Figure 3:
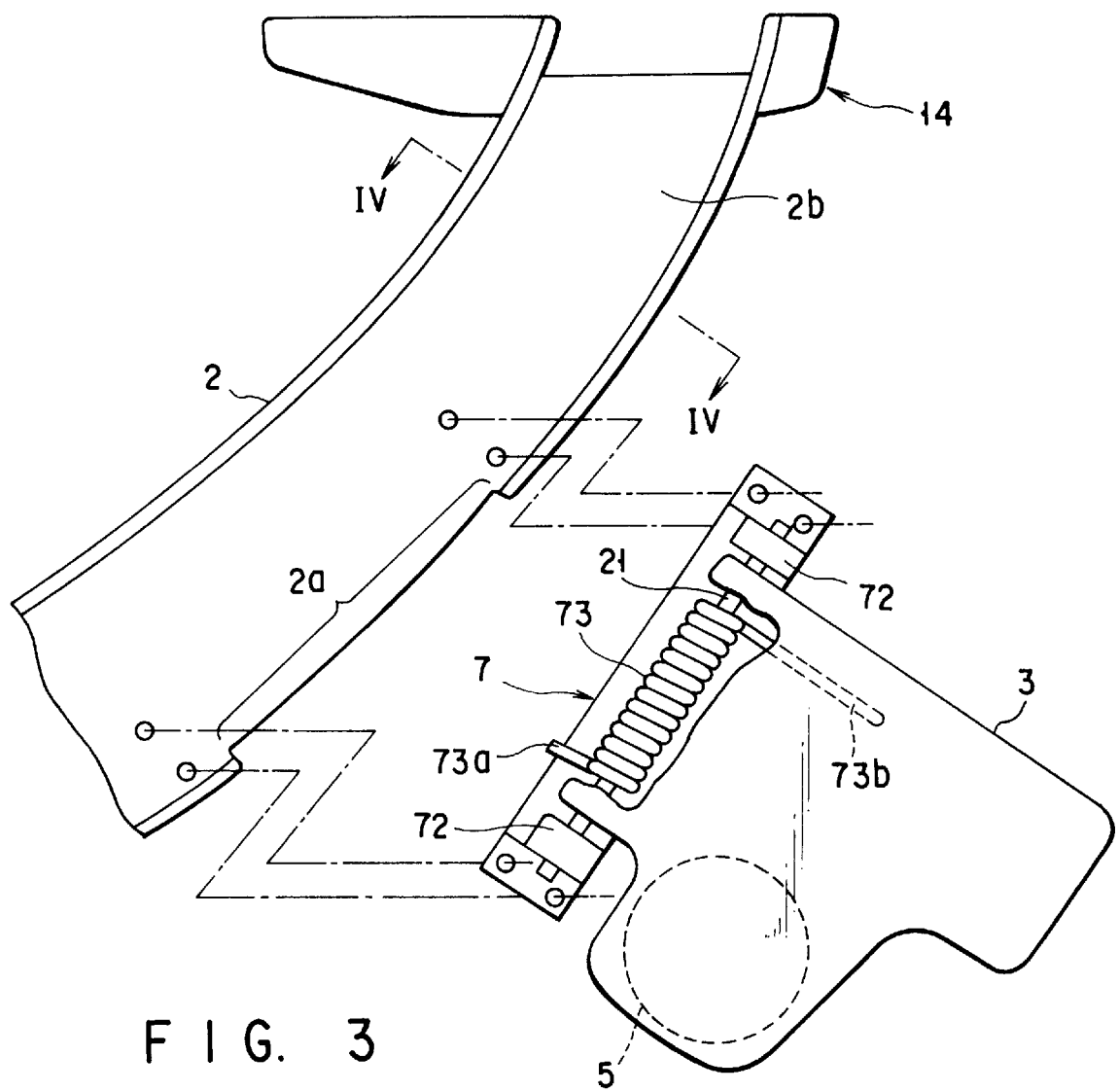
FIG. 3 is a view, showing an essential part of a head-mount image display apparatus according to a modification of the embodiment of FIG. 1.
Figure 4:
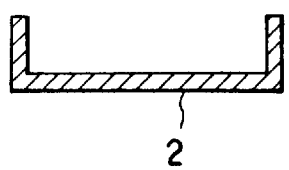
FIG. 4 is a cross sectional view, taken along lines IV—IV of FIG. 3.
Figure 5:
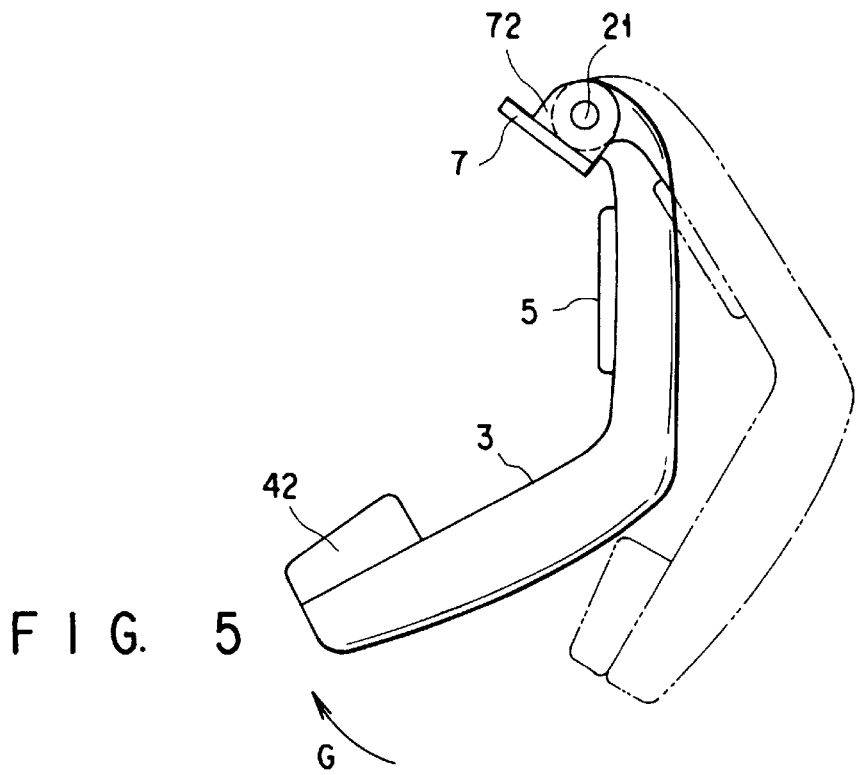
FIG. 5 is a view, showing movement of each of the rotating members in a direction indicated by arrow G.

FIGS. 3–5 show an essential part of a head-mount image display apparatus according to a modification of the invention.

In the modification, to increase the strength, a pair of support members 2 are made to have a cross section as shown in FIG. 4. Since in the modification, the pair of support members 2 and other component pairs have structures identical to each other, only one of the pairs will be described.

A shaft 21 which supports each rotating member 3 extends between a pair of shaft bearings 72 respectively provided on the opposite ends of a fixing member 7. The fixing member 7 is fitted in a cutout portion 2a formed in each support member 2, and secured to the member 2 by means of e.g. screws.

A torsion spring 73 is mounted on the shaft 21, and has one end 73a thereof supported by the fixing member 7, and the other end 73b inserted in the rotating member 3. Thus, each rotating member 3 is always urged in a direction indicated by arrow G (see FIG. 5), i.e. toward a corresponding ear of the observer.

Since the other structures are substantially identical to those employed in the embodiment shown in FIGS. 1 and 2, they will not be described.

In the above-described structure, the rotating member 3 is rotated in the direction indicated by arrow G at the time of mounting the image display apparatus on the head of the observer, with the result that the occipital pad 42 is urged against the rear head of the observer.

Since the fixing member 7 receives the reaction force of the torsion spring 73, it is formed of a highly rigid material. By virtue of the fixing member 7, the reaction force of the torsion spring 73 is prevented from directly acting upon the support member 2. In light of this, the support member 2 may be formed of a material of a relatively low rigidity, which means that a center portion 2b of the support member 2 can be made thin and accordingly the overall apparatus can be made, compact and light.

Although the cutout portion 2a of the support member 2 is lower in rigidity than the other portion, the fixing member 7 of a high rigidity attached to the cutout portion 2a reinforces the portion 2a. As a result, a rigidity of the overall fixing member 7 can be improved.

The other advantages of the modification are similar to those of the above-described embodiment, and hence will not be recited.

Figure 6:
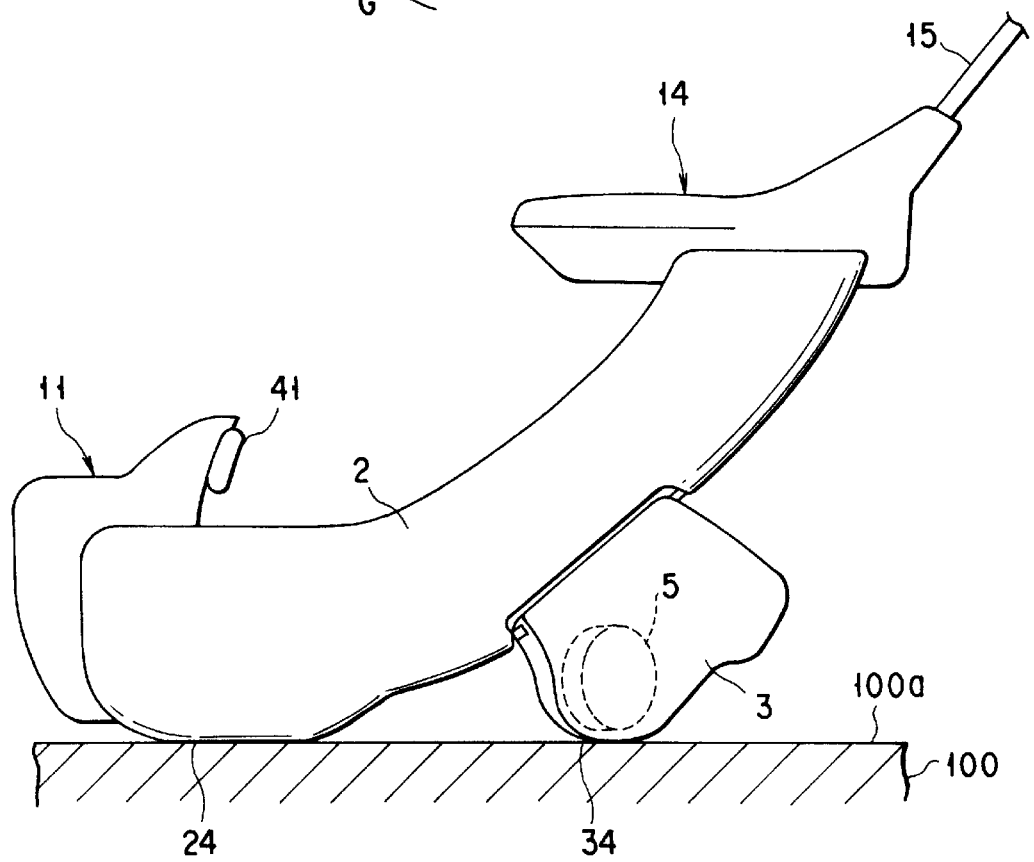
FIG. 6 is a view, showing a state of the head-mount image display apparatus of the invention placed on a table.

FIG. 6 shows a state in which the head-mount image display apparatus of the invention is placed on the surface 100 *a* of a table 100. FIG. 7 shows a state in which the head-mount image display apparatus of the invention is mounted on the head of the observer. FIG. 7 is a view taken from above the head of the observer.

As is shown in FIG. 6, the pair of support members 2 and the pair of rotating member 3 have convex portions 24 and 34, respectively, to be brought into contact with the surface 100a of the table 100 when the apparatus is placed on the table.

Elastic members (not shown) made of rubber or a resin are attached to the convex portions 24 and 34 for absorbing a shock applied thereto when they contact the table or the like. Instead of attaching the elastic members, the convex portions 24 and 34 themselves may be made of an elastic material.

By virtue of these convex portions, the image display apparatus can be kept well-balanced on a table or the like, thereby preventing it from falling therefrom Further, where the action of placing the apparatus on the table is repeated, those portions of the apparatus which may be damaged can be expected. This being so, substitutes can be prepared beforehand, which will facilitate the maintenance of the apparatus.

Furthermore, as indicated by the two-dot chain line of FIG. 7, the occupation area of the apparatus can be reduced by folding each rotating member 3 in the direction indicated by arrow E. Therefore, its storage place can be easily selected, and also the apparatus can be easily stored or packed.

Similarly, since each rotating member 3 can be moved in the direction indicated by arrow D, the apparatus can be easily and smoothly mounted on or dismounted from the head of the observer.

At the time of rotating each rotating member 3 in the directions indicated by arrows D and E as shown in FIGS. 8A and 8B, the fixing member 7 can be also used as a stopper for stopping the rotation. When the rotating member 3 is brought into contact with the fixing member 7, the rotational force of the rotating member 3 is absorbed in the highly rigid fixing member 7 which means that the rotational force is prevented from directly acting upon each support member 2, and hence that the support member 2 will be free from damage.

Figure 9:
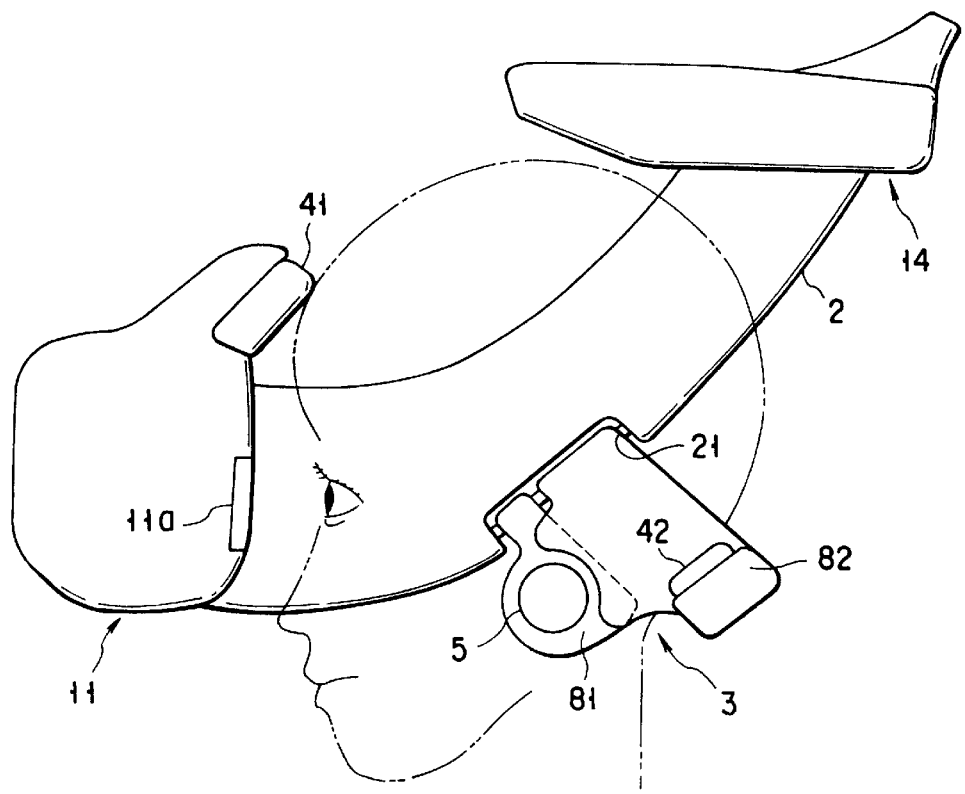
FIG. 9 is a view, showing a head-mount image display apparatus according to a modification of the invention.
Figure 10:
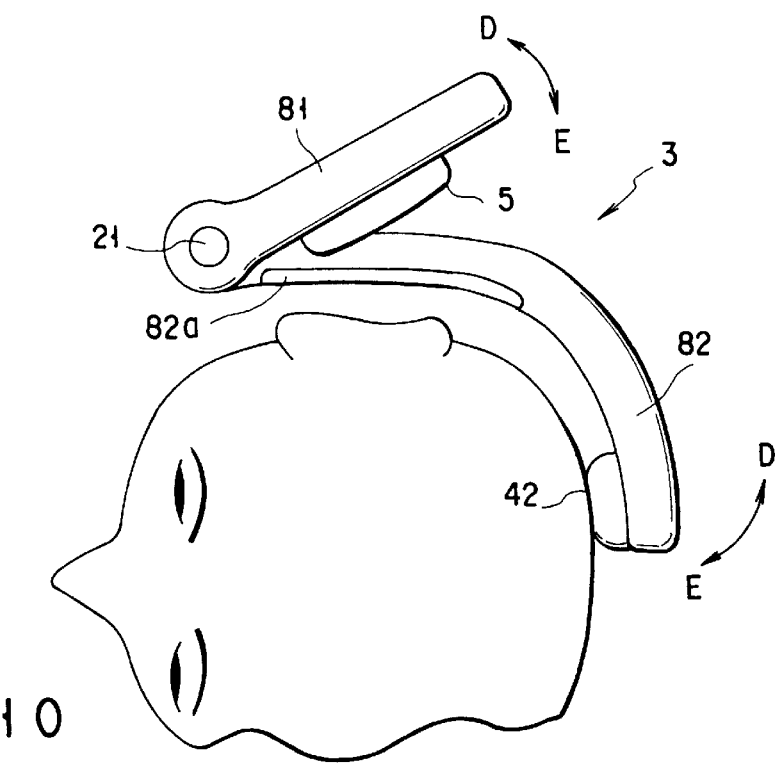
FIG. 10 is a view, showing a state in which only a first rotating element is moved.
Figure 17:
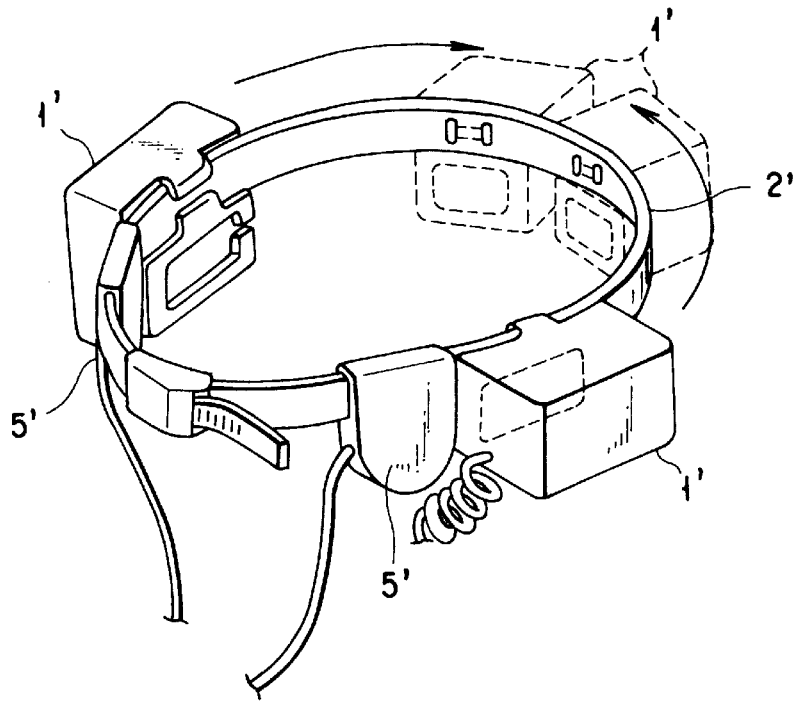
FIG. 17 is a view, showing a conventional head-mount image display apparatus.
Figure 18:
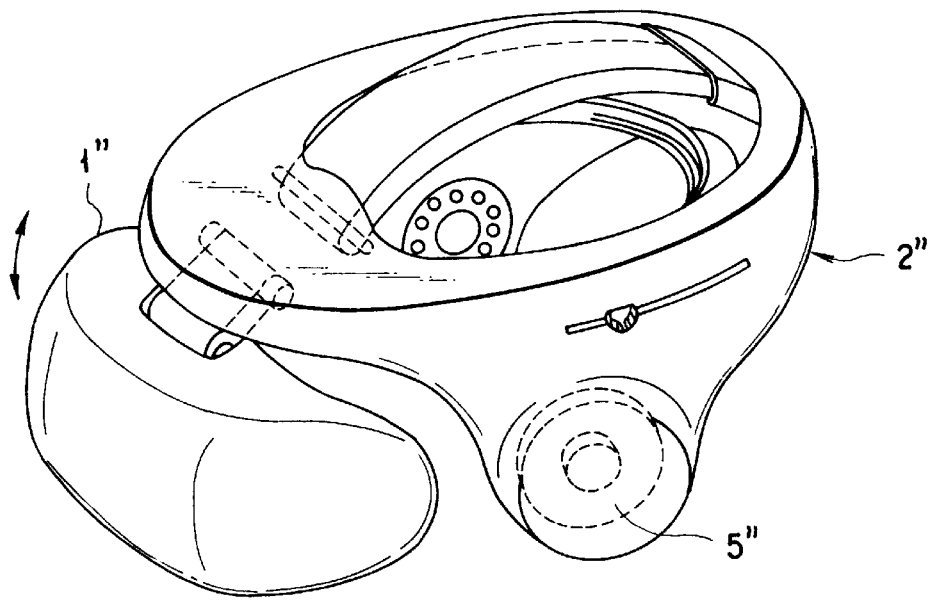
FIG. 18 is a view, showing another conventional head-mount image display apparatus.

FIGS. 9–11 show a head-mount image display apparatus according another modification of the invention.

In this modification, each of the pair of rotating members 3 has a first rotating element 81 and a second rotating element 82, which are both rotatably supported by a shaft 21. Each of speakers 5 is attached to a corresponding first rotating element 81.

A contact portion 82a is provided on each second rotating element 82. When in this modification, the second rotating element 82 is moved to the outside (in the direction indicated by arrow D), the contact portion 82a is brought into contact with the first rotating element 81, thereby moving the first rotating element 81 to the outside (in the direction indicated by arrow D), too. The contact portion (not shown) may be provided on the first rotating element 81, such that the second rotating element 82 is brought into contact with the contact portion.

The first rotating element 81 is always urged toward the contact portion 82a by means of an elastic member (not shown), which may be formed of a torsion spring as shown in FIG. 3.

The other structures are similar to those in the above-described embodiment shown in FIGS. 1 and 2, and hence will not be described.

At the time of mounting the apparatus of this modification on the head of the observer, only the rotating element 81 can be moved in a direction indicated by arrow I (see FIG. 11) in order to accord the apparatus with the size of the ears of the observer. Thus, the speaker 5 can be brought into contact with the ear by an optimal force, and therefore vivid voice information can be always transmitted to the observer.

Also, even when the first rotating element 81 is thus moved, the second rotating element 82 can be situated in a predetermined position. Accordingly, the occipital pad 42 attached to the second rotating element 82 is always urged against the rear head of the observer with a predetermined force. Thus, the apparatus can be kept well-balanced on the head.

Moreover, since the first rotating element 81 can be moved together with the second rotating element 82 as described above, the apparatus can be effectively mounted on or dismounted from the head.

FIGS. 12–15 show essential parts of a head-mount image display apparatus according to a further modification of the invention.

In this modification, each of the rotating members 3 comprises first and second elastic members 91 and 92 formed of a plate spring or rubber.

The first elastic member 91 has one end fixed to the support member 2, and the other end supporting the speaker 5. The second elastic member 92 has one end fixed to the support member 2, and the other end supporting the occipital pad 42.

The first elastic member 91 also has a contact portion 91a. When in this modification, the second elastic member 92 is moved to the outside (in the direction indicated by arrow D), the second elastic member 92 is brought into contact with the contact portion 91a, thereby moving the first elastic member 91 to the outside, too. The contact portion (not shown) may be provided on the second elastic member 92, such that the first elastic member 91 is brought into contact with the contact portion.

As is shown in FIGS. 14 and 15, the first elastic member 91 has a groove 33 formed therein, along which groove 33 the speaker 5 can move in directions indicated by the arrows.

At the time of mounting the apparatus constructed as above, on the head of the observer, only the first elastic member 91 can be moved in a direction indicated by arrow M (see FIG. 13) in order to accord the apparatus with the size of the ears. As a result of the movement of the first elastic member 91, the speakers 5 are made to contact the ears with an optimal urging force, thereby enabling transmission of vivid voice information to the observer. In addition, since the apparatus can be made simple in structure, its manufacturing cost can be reduced and its mount can be facilitated.

At least one of the first and second rotating elements 81 and 82 (shown in FIGS. 9–11) may be formed of an elastic material. Also, as is shown in FIG. 16, the first and second elastic members 91 and 92 may be formed monolithically.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. A head-mount image display apparatus comprising:

a display apparatus body having image display elements for displaying thereon predetermined images, and eyepiece optical systems for guiding the predetermined images displayed on image display elements, to eyeballs of an observer;

a support member for supporting the display apparatus body on a head of the observer;

rotating members attached to the support member and rotatable through an angle falling within a predetermined range; and speakers provided in the rotating members, respectively, for transmitting predetermined voice information to the observer.

2. The apparatus according to claim 1, further comprising elastic members urging the rotating members in predetermined directions, respectively, and convex portions provided at the rotating members, respectively, such that the apparatus can be placed substantially horizontal.

3. The apparatus according to claim 1, wherein the support member has axes rotatably supporting the rotating members, respectively, and the rotating members are slidable along the axes, respectively, and rotatable about the axes, respectively.

4. The apparatus according to claim 1, wherein each of the rotating members has a first element and a second element rotatably attached to the first element, and a corresponding one of the speakers is supported by one of the first and second elements.

5. The apparatus according to claim 2, wherein each of the elastic members has a spring member urging the rotating members toward the head of the observer.

6. The apparatus according to claim 1, wherein each of the rotating members has a position adjusting means for adjusting the position of the speakers.

7. The apparatus according to claim 3, wherein the axes are coupled with fixing members detachable from the support member, respectively, and the fixing members also serve as reinforcing members for the support member.

8. The apparatus according to claim 1, wherein the rotating members are formed of elastic members with a predetermined elasticity, respectively.

* * * * *